United States Patent

Tan et al.

[11] Patent Number: 5,978,560
[45] Date of Patent: Nov. 2, 1999

[54] LOAD BALANCING OF DISTRIBUTED PRINTING SYSTEMS USING ENHANCED PRINTER ATTRIBUTES

[75] Inventors: Shee-Yen Tan, Walnut; Joseph Z. Fung, Artesia; Shengkuo Fan, Los Angeles; David Paul Nesbitt, Redondo Beach, all of Calif.

[73] Assignee: Xerox Corporation, Stamford, Conn.

[21] Appl. No.: 08/966,409

[22] Filed: Nov. 7, 1997

[51] Int. Cl.[6] ............................. G06K 1/00; H04N 1/21; H04N 1/00

[52] U.S. Cl. .......................... 395/114; 395/115; 358/296; 358/407

[58] Field of Search ................................... 395/101, 111, 395/112, 114, 115; 358/296, 405, 407, 406

[56] References Cited

U.S. PATENT DOCUMENTS

| | | |
|---|---|---|
| 5,179,636 | 1/1993 | Nardozzi . |
| 5,287,194 | 2/1994 | Lobiondo . |
| 5,559,933 | 9/1996 | Boswell . |
| 5,630,079 | 5/1997 | McLaughlin . |
| 5,813,348 | 9/1998 | Zinghher ................................. 395/114 |
| 5,873,659 | 2/1999 | Edwards et al. ........................ 395/114 |

*Primary Examiner*—Edward L. Coles
*Assistant Examiner*—Mark Wallerson
*Attorney, Agent, or Firm*—Oliff & Berridge, PLC

[57] ABSTRACT

A distributed printing system that more optimally distributes job requests within a distributed printing system based on more detailed information about the particular attributes of each output device. In particular, additional printer attributes are used that allow greater utilization of a plurality of attached printers having differing capabilities. These attributes include "max-concurrent-jobs-processing" (MCJP), "number-of-jobs-on-device" (NJOD) and "number-of-cascaded-jobs" (NCJ), and a attribute value "saturated" for the attribute "printer-state". The attribute MCJP is an integer value that is based on the capabilities of the printer. NJOB and NCJ attributes allow monitoring of jobs sent to each printer for supported and unsupported printers. If NJOB or NCJ are greater than MCJP, then the attribute "printer-state" is set to "saturated", prohibiting further spooling of print jobs to that particular printer.

18 Claims, 7 Drawing Sheets

LOAD BALANCING OF DISTRIBUTED PRINTING SYSTEMS USING ENHANCED PRINTER ATTRIBUTES

BACKGROUND OF THE INVENTION

1. Field of the Invention

The invention relates to improved load balancing of distributed printing systems, such as a client/server printing system, through use of enhanced printer attributes.

2. Description of Related Art

Known distributed printing systems, such as client/server printing networks, include one or more servers and multiple printers associated with the server. In such systems, first-in-first-out (FIFO) queuing is often used. Typically, a job from a particular user is sent to a particular user-defined and selected printer. Such a system does not optimally utilize its resources, as certain printers inevitably handle more job requests than other available printers. In such a scenario, one particular printer may have a long job queue and long delay times in printing while other networked printers are in an idle state (i.e., not in current use).

Recently, distributed printing systems have been designed in an attempt to improve on this by providing some degree of load balancing. In such systems, if a selected output device is in use, the job request will be spooled to an available printer within the distributed system. Such a system provides limited load balancing (i.e., if three printers are provided, each will receive on average about ⅓ of the search requests).

Additionally, while some printers within certain distributed printing system environments are capable of providing information back to the server (i.e., idle, printing), some "dumb" printers or foreign printers (i.e., printers not supported by a particular printing system) may not be capable of returning feedback information useful in determining load balancing.

SUMMARY OF THE INVENTION

This invention thus provides printer attributes for a physical printer that more accurately reflect the capabilities of the particular output device.

This invention further provides a system that can more optimally distribute job requests within a distributed printing system based on more detailed information about the particular attributes of each output device.

This invention additionally provides a distributed printing system that better approximates job loads on such printers and overcomes problems with the prior art. This invention also provides better load balancing for distributed printing systems, even when using foreign/unsupported output devices.

In order to balance the load on each of the print servers or output devices, many printer attributes may be taken into account. To enhance the ability to achieve load balancing, the system and method of the invention also include the new printer attributes: "maximum-concurrent-job-processing", "number-of-jobs-on-device", "number-of-cascaded-jobs", and a new value "saturated" for "printer-state" attribute.

The attribute "max-concurrent-job-processing" is a static value that is input by a system administrator. This modifiable printer attribute is preferably entered only once upon initial configuration of the printer.

The attribute "number-of-jobs-on-device" is an attribute returned from a supported printer in response to a job status query. This attribute indicates the number of jobs currently spooled to this particular printer device.

The attribute "number-of-cascaded-jobs" (NCJ) is used to track jobs sent to unsupported or foreign output devices/printers. This attribute is incremented every time a print job is sent to a printer and is decreased each time a print job is completed.

Rather than having only idle and printing states, the "printer-state" is set to "saturated" value to indicate that the printer can accept no further jobs and will not send any further job requests until it is no longer saturated.

Preferably, load balancing is performed based on the number of concurrent processing jobs the particular printer can handle.

Further objects and advantages of the invention will be readily apparent in view of the following disclosure and the appended claims.

BRIEF DESCRIPTION OF THE DRAWINGS

The invention will be described with reference to the following drawings, in which like numerals refer to like elements and wherein.

DESCRIPTION OF THE PREFERRED EMBODIMENTS

Figure 1:
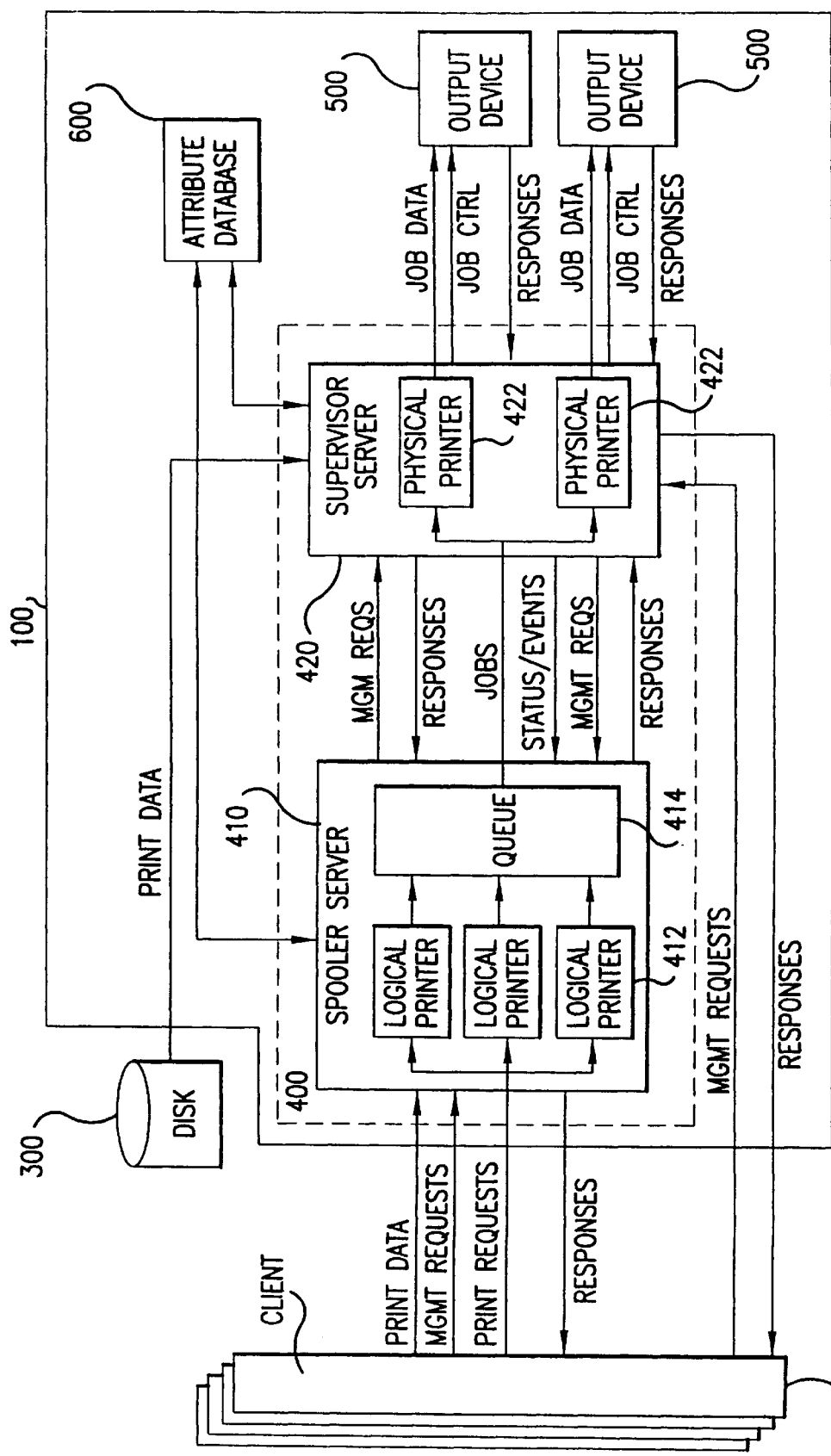
FIG. 1 shows an exemplary client/server distributed printing system according to the invention.

FIG. 1 shows the architecture of a client/server distributed printing system 100, including one or more clients 200, a general purpose computer system 400, which in this invention is preferably a server system, one or more output devices 500, a disk 300 and an attribute database 600. Each client 200 initiates print requests to print a specified file or files containing print data, and initiates management requests to manage printing systems, such as adding or deleting printers, canceling print requests and the like. The print data can include text or graphics created by an end user.

The server 400 receives print requests from the clients 200, performs actions required for each request operation, and returns responses to the corresponding client 200. The server 400 organizes documents into print jobs. A document represents a single user file that is to be printed. A print job represents a collection of one or more documents that are printed as a unit. The print job includes instructions for printing (such as production and finishing), event notification, and response delivery. The server 400 also is responsible for sending job data and associated job control commands to the output device 500.

Each output device 500 is a physical device or hardware that is capable of rendering images or documents to produce a hard copy output of the print jobs received from the server 400. Depending on the type of output device 500 and/or the settings of its particular features, each output device 500 returns responses to the server 200 indicating, for example, its current state. Output devices 500 can include, but are not limited to, printers, facsimile machines or pagers. However, as a non-limiting example, this disclosure refers to the output devices 500 as printers, for simplicity.

In a preferred system, implemented on a general purpose computer, the server functions are split between two different server types, a spooler server 410 and a supervisor server 420. Additionally, such an exemplary system supports two types of output devices: logical printers 412 (LP1, LP2 and LP3) and physical printers 422 (PP1 and PP2).

The spooler 410 receives a client print request for a print job that specifies a particular logical printer. The spooler 410 then schedules the print job on an appropriate physical printer 422 associated with the specified logical printer 412. At an appropriate time, the spooler 410 forwards the print job to the supervisor 420 associated with the physical printer 422 on which the spooler 420 scheduled the print job. The spooler 410 can support multiple supervisors 420.

The supervisor server 420 delivers data to one or more of the output devices 500. The supervisor 420 also receives jobs from the spooler 410, interprets job requests for print submission, receives print data, passes the data and the job control commands to an appropriate output device 500, and handles any responses made by the output devices 500.

The supervisor 420 receives client management requests that apply to print jobs forwarded to the supervisor, including those print jobs forwarded further to one of the output devices 500. The supervisor 420 also sends management requests to the spooler 410, such as, for example, a request for next job, and status updates, such as "job completed." The supervisor 420 also notifies the spooler 410 of events, such as canceling a print job in response to a "Job Cancel" management request from a user.

The logical printer 412 indicates particular characteristics and capabilities of one or more physical printers 422. In essence, a logical printer is an abstraction of printer capability that serves as a selectable device and a gateway into the spooler 410. A physical printer 422 represents an actual output device, such as a Xerox 4230 laser printer connected to the printing system 100.

Users of the client 200 direct print requests to logical printers 412 having characteristics that meet their needs, such as A4 paper, highlight color, and/or stapled output. The spooler 410 channels the request via the queue 414 to the supervisor 420 that supports a physical printer 422 mapped to the specified logical printer 412 through the queue 414. The queue 414 associates a set of print jobs with a set of logical and physical printers 412,422 and hold print jobs until the spooler 410 can send the print jobs to an appropriate supervisor 420. Logical printers 412 feed print jobs into the queue 414 and the physical printers 422 request print jobs from the queue.

Figure 2:
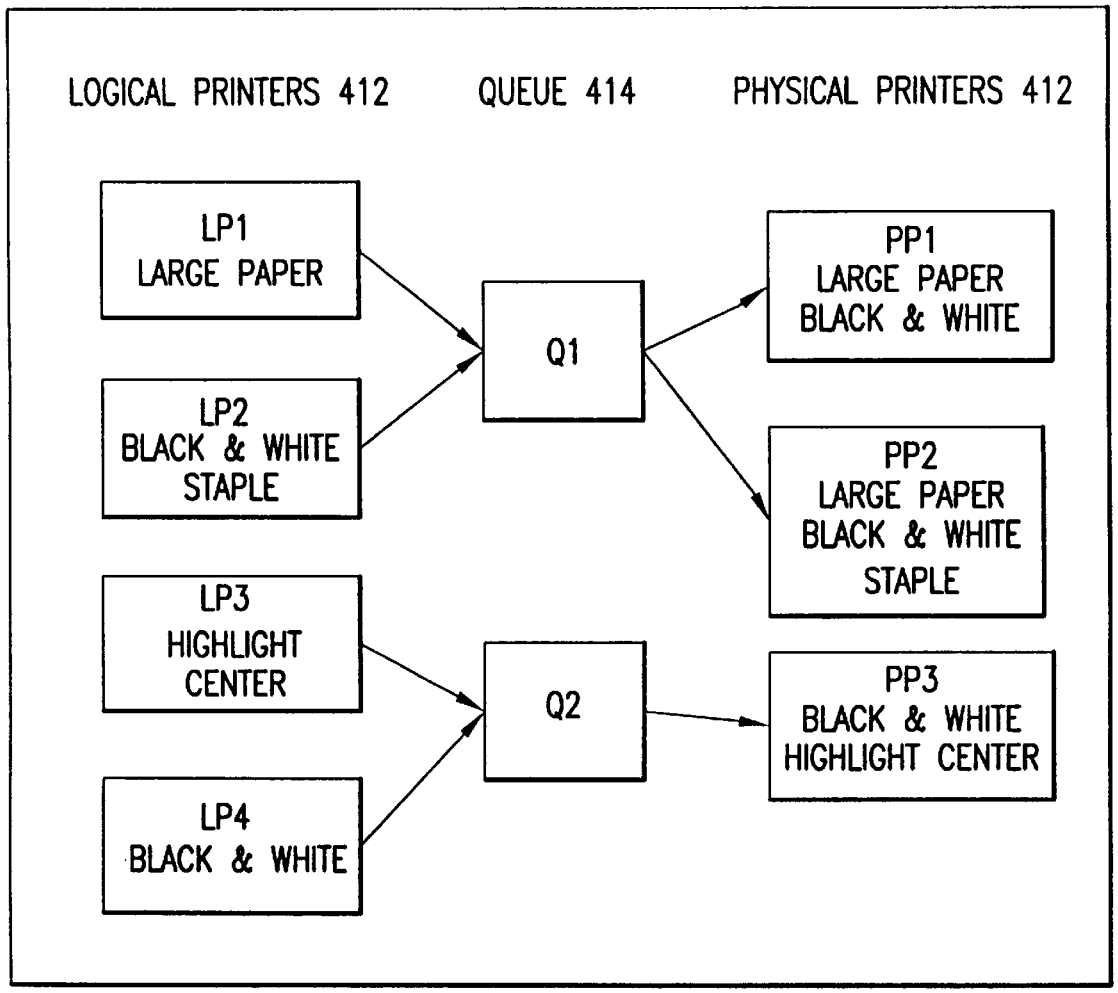
FIG. 2 shows exemplary job flow from a plurality of logical printers to a plurality of physical printers through one or more queues.

As shown in FIG. 2, a larger network client/server system can have numerous logical printers associated with numerous physical printers through a plurality of queues. This type of system is capable of load balancing, in which jobs can be directed to alternate printers associated with the same queue. The alternate printers also provide printing characteristics required by an associated logical printer.

Such a distributed printing system uses objects to represent various entities, such as the logical printers, the physical printers and/or the queues, although objects can represent the spoolers and the supervisors as well. An object contains a collection of attributes that provide information about the object. Examples of printer attributes are:

printer-name: a single-valued attribute whose value is a name that uniquely identifies a logical or physical printer.

media-supported: a multi-valued attribute whose values identify the media that the printer supports, such as "iso-A4 white".

printer-state: a single-valued attribute that indicates the current status of a printer, such as "idle" or "printing".

Each object is defined by this set of attributes, which can contain static and dynamic attributes. The spooler 410 and supervisor 420 manipulate the object representation of an entity they are operating on by setting or changing the values of the object's attributes. For those attributes that can be manually changed, a user can observe the value of an attribute with a "list attributes" command and change the value of an attribute with a "set attributes" command. The print capabilities of a print system are limited by the predefined set of system attributes fixed for each printing system.

Figure 3:
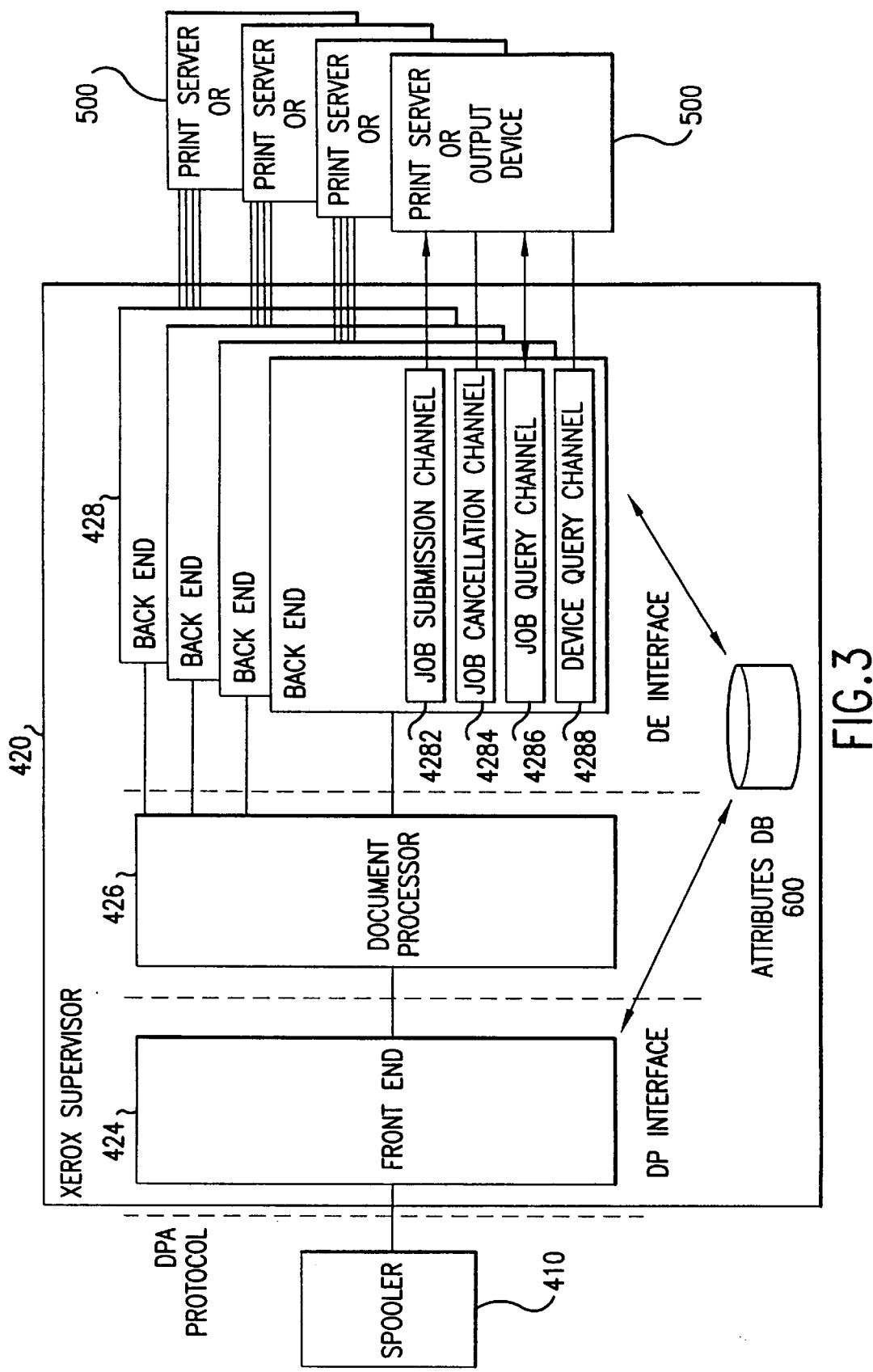
FIG. 3 shows a more detailed supervisor server according to the invention.

FIG. 3 shows the interaction of various components of a preferred client/server printing system when a print job is submitted for processing. This system includes a supervisor server 420 that includes a front end module 424, a document processor 426, and a back end module 428. There can be multiple back end modules 428 complemented in the supervisor 420, as described in copending U.S. Application (Attorney Docket No. JAO 34199), filed herewith and incorporated herein by reference. Such back end modules 428 include a job submission channel 4282, a job cancellation channel 4284, a job query channel 4286, and a device query channel 4288. The attribute database 600 is used by the front end module 424, and it includes attributes such as printer attributes and job attributes.

Upon receiving a call from front end module 424 to process a print job, document processor 426 determines if the printer is in a correct state to process the print job. If it is, the document processor 426 spawns a thread and notifies the front end module 424 that the print job is in a printing state.

The document processor 426 then calls the job submission channel 4282 of the appropriate back end module 428 and forwards the print job to that back end module 428. The back end module 428 can support multiple job submission channels 4282. Thus, the back end module 428 prepares the print job and submits the job through the specified channel 4282.

Upon receiving a call, the back end module 428 requests the document attributes and document data from the document processor 426. Depending on the submission channel 4282, the back end module 428 may convert the print job attributes or document attributes into the submission channel's attribute format. The back end 428 may also modify the document data to embed information in the document data.

The back end module 428 then determines the destination location and address of the appropriate output device 500 and forwards the print job to that output device. An example printer address format for the invention is "hostName, printerName, Extension". The "hostName" is the machine name on which the print server is running. The "printerName" is the name of the output device (printer) 500. The "Extension" is used to distinguish different kinds of job attributes conversion formats.

If the back end module 428 is unable to retrieve the job identifier from the print server or output device 500 via the job submission channel 4282, the back end module 428 will generate a unique job identifier for monitoring the job. The back end module 428 allocates the memory for output and assigns this token job identifier to it.

The back end module 428 then notifies the document processor 426 which in turn notifies the front end module 424 that the print job is in a printing state. The back end module 428 queries the document processor 426 for any job attribute changes.

Before checking the job status, the back end module 428 checks if the print job identifier that was generated is valid for the querying print job. The back end module 428 performs this function by checking the job submission channel used to ensure that this back end job query channel 4286 perform further job status queries.

The document processor periodically retrieves the latest job information. If possible, the back end module 428 allocates memory to specify the number of print jobs that are currently queued on the output device 500. The document processor saves this value into its own memory and frees the back end memory, setting this value to NULL before again calling the back end module 428. If the back end module 428 could not obtain the value, it leaves the number of print jobs as NULL.

When a new print server or output device 500 is added to the system, the document processor 426 registers the device in the back end module 428 if the device is one that is supported by the back end module. The back end module 428 keeps internally a list of registered print servers or output devices 500.

In order to balance the load on each of the print servers or output devices, many printer attributes may be taken into account such as "printer pages per minute", "resolution" (in dots per inch), "document copies", "number of queued jobs", "number of documents", "number of pages", "total job octet count", and the like. To enhance the ability to achieve load balancing, the system and method of the invention also are including: "maximum-concurrent-job-processing", "number-of-jobs-on-device", "number-of-cascaded-jobs", and "printer-state-saturated".

The first attribute, "max-concurrent-job-processing" (MCJP), is a static value that is input into the attribute database file 600 by a system administrator at the supervisor server 420. This inputting can be performed through a Graphical User Interface (GUI) associated with the system and is preferably entered only once upon initial configuration of the output device 500. The other three attributes are dynamic and change based on the individual loads of the physical printers 422.

The attribute "number-of-jobs-on-device" (NJOD) is an attribute returned from a supported printer in response to a job status query by the supervisor. The NJOD attribute indicates the number of jobs currently spooled to this particular printer device.

The attribute "number-of-cascaded-jobs" (NCJ) is useful for tracking jobs sent to output devices that are unable to response to the number of jobs currently spooled in it. The NCJ attribute is incremented every time a print job is sent to an output device 500 and is decreased each time a print job has been completed.

The last attribute value "saturated" is a value for a newly defined printer state. Rather than having only idle and printing states, this attribute value indicating whether the printer is "saturated." Thus, the "printer-state" attribute is set to "saturated" whenever the attributes NJOD or NCJ are greater than or equal to MCJP and indicates that the printer can accept no further jobs and will not send any further job requests until such time that NJOD or NCJ are less than MCJP, at which time the "printer-state" is set to idle or printing.

In a preferred embodiment, load balancing is performed based on the number of concurrent processing jobs the particular output device can handle. The invention recognizes that various printers associated with the printing system can have greatly varying capabilities in speed and other qualities. For instance, the distributed system may include a desktop printer with a very low output speed of around 3–4 ppm and an production printer, such as the Xerox DocuPrint 4635 NPS, which has a very high output speed of about 135 ppm. Printers also have varying levels of internal memory for handling and queuing jobs. Accordingly, by this invention, individual printers are assigned a MCJP attribute based on the number of jobs that can be effectively handled concurrently.

Taking a production printer having a MCJP attribute set to 5 as a non-limiting example, the document processor 426 will not stop sending out print job requests to the spooler 410 until the query status of the output device 500 shows five queued jobs to the output device 500. While the number of jobs is less than the maximum for the output device 500, the document processor 426 will inform the front end module 424 to periodically request for job in order to balance the load.

If the "number-of-jobs-on-device" or number-of-cascaded-jobs" value of these attributes exceeds the set value "max-concurrent-job-processing" attribute, the "printer-state" attribute is set to "saturated" and jobs are no longer submitted to the associated remote spooling server for that particular printer. This feature balances the load of system printers, no matter if the printers [probably not necessary as we are only concerned with the ability to return a NJOD value.] running on a foreign printing system could return the NJOD or not.

Figure 4:
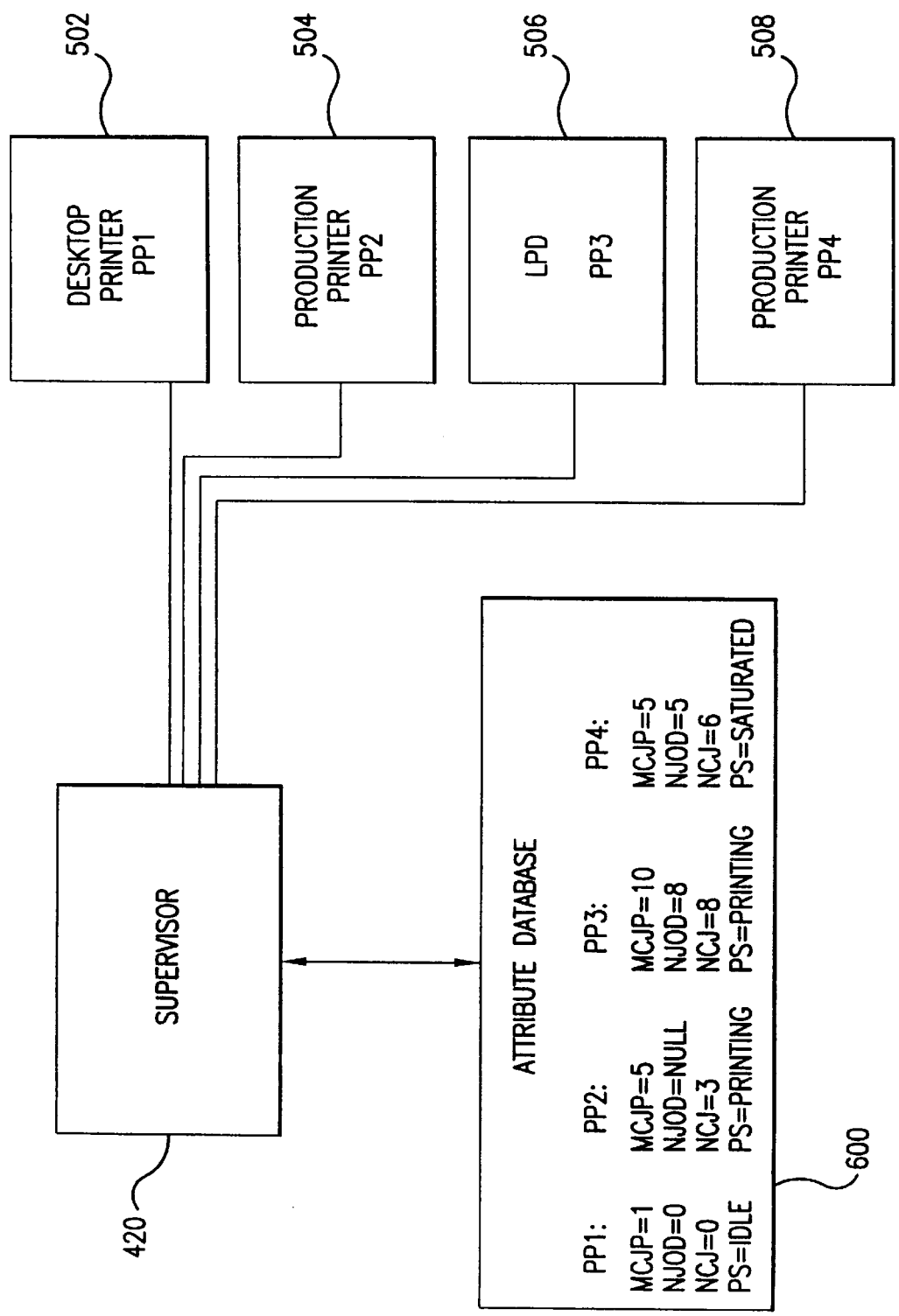
FIG. 4 shows a supervisor server controlling four output devices of varying printing capabilities according to the invention.

A specific example of such a system is illustrated in FIG. 4 in which supervisor 420 manages four physical printers 502, 504, 506 and 508, each of varying capabilities. Printer 502 is a low-end desktop printer. Printers 504 and 508 are production printers with higher capacities and much improved memory and processing speed. Printer 506 is a production printer of even greater speed and capability, such as the Xerox DocuPrint 4635 printer.

The attribute database 600 associated with the supervisor 420 includes attributes of each printer, of which only a partial attribute list is shown. Individual MCJP values are entered by a system administrator based on the individual capabilities of each particular printer. These values are integer values that represent the number of concurrent jobs that can be handled by the device. Exemplary values are "1" for the desktop printer, "5" for the production printer, and "10" for the high speed production printer. However, these values can be arbitrarily changed to more accurately reflect the particular capabilities of the output device relative to the particular distributed printing system used and other output devices on the printing system. The other listed attributes are dynamic and change upon changes in the system load.

In this example desktop printer 502 is shown in an "idle" printer state with no jobs cascaded to or on the device. The printer 502 is obviously ready to accept a print job. The production printer 504 is in a "printing" printer state. As the attribute NJOD is NULL, this printer does not support this function. However, job tracking can still be achieved by use of the NCJ attribute, which indicates that 3 jobs have been cascaded (sent) to the device. As this particular printer, a production printer, is capable of handling up to five concurrent jobs as indicated by the MCJP=5 attribute, printer 504 is capable of receiving additional jobs (i.e., the attribute printer-state is not set to "saturated").

Likewise, the printer 506, a high speed production printer is currently in a "printing" printer state and is able to accept additional print jobs, as it currently has less than the maximum number of print jobs it can handle. The printer 506 supports the NJOD feature. As this attribute is more accurate than NCJ, it is used in determining load balancing. However, the printer 508, another production printer, is not able to accept any more jobs as its printer state is "saturated" due to the NJOD (as well as NCJ) value being equal to or greater than the MCJP value of 5. Accordingly, job requests are no longer sent for PP4 until its status returns to a "printing state" and the attribute printer-state has been set to "saturated" (i.e., when the number of jobs on device becomes less than MCJP).

Figure 5:
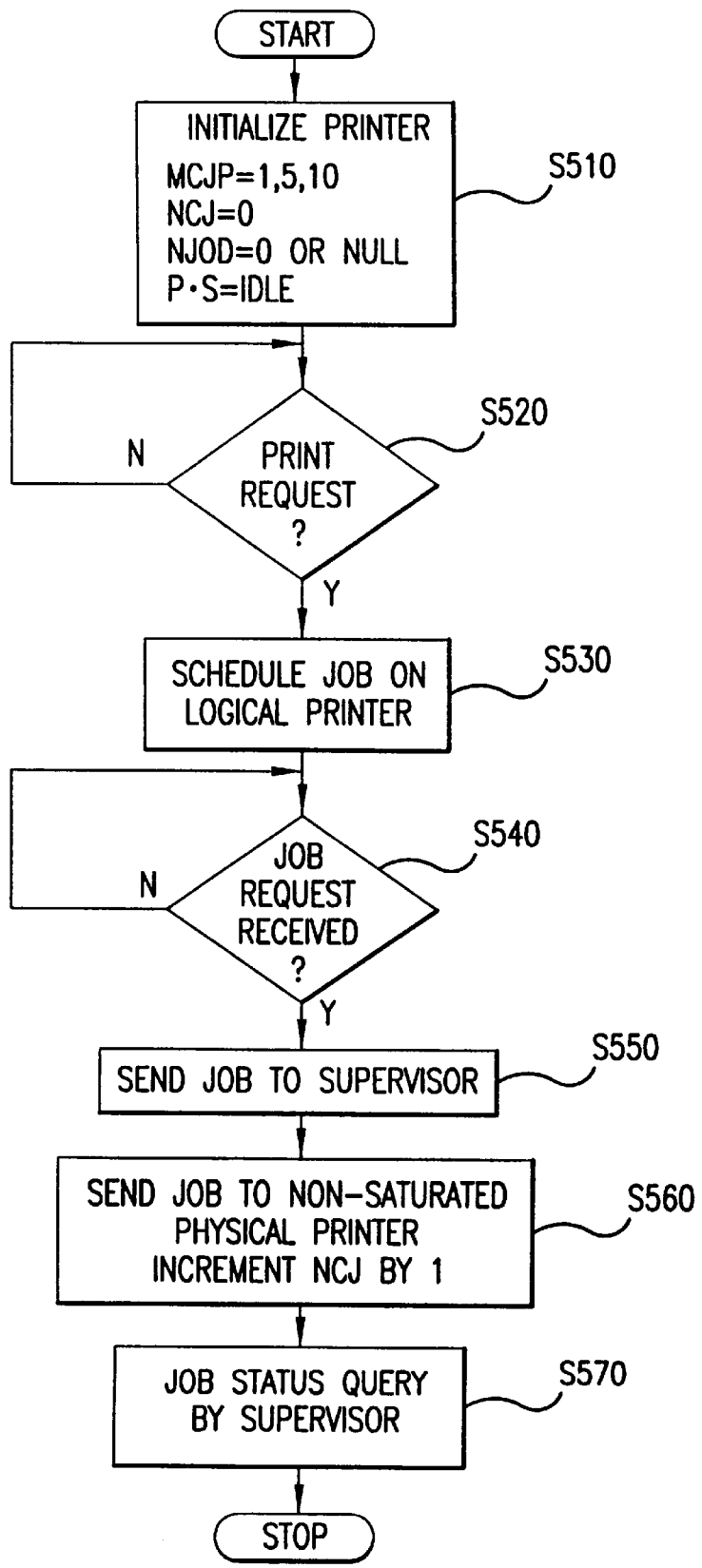
FIG. 5 is a flowchart outlining job scheduling according to a preferred embodiment of the invention.

FIG. 5 is a flowchart outlining one method for processing print requests. In step S510, the control routine initializes the attributes file for each printer corresponding to the attributes file 600. As the value for MCJP is a static value and is preset by the system administrator using a common input, such as a Graphical User Interface (GUI), during programming or setting up of the corresponding output device 500, its value remains the same until the system administrator desires a change in this value. The attribute NCJ is set to "0" for each printer, as no jobs are pending. The attribute NJOD is set by default to "NULL", but may be set to zero if this feature is supported by the corresponding printer. The printer-state (PS) of each printer should be "idle".

In step S520, if the printer state is saturated, the control routine then conducts a status check for the "printer-state". If the printer is in idle or printing state, control continues to step S530 where the print request is sent to spooler 410 and queue 414 is asked to schedule a job. If, in step S540, there is no new job available, control jumps back to step S540. Once there is a new job available to be scheduled by queue 414, which is notified by logical printer 412, control continues to step S550. Then, in step S560, the print job is sent to a non-saturated physical printer 422 and the attribute NCJ is incremented by 1. Then, in step S570, the supervisor 420 conducts print job status queries with the physical printer 422 to determine the status of the print job.

Figure 6:
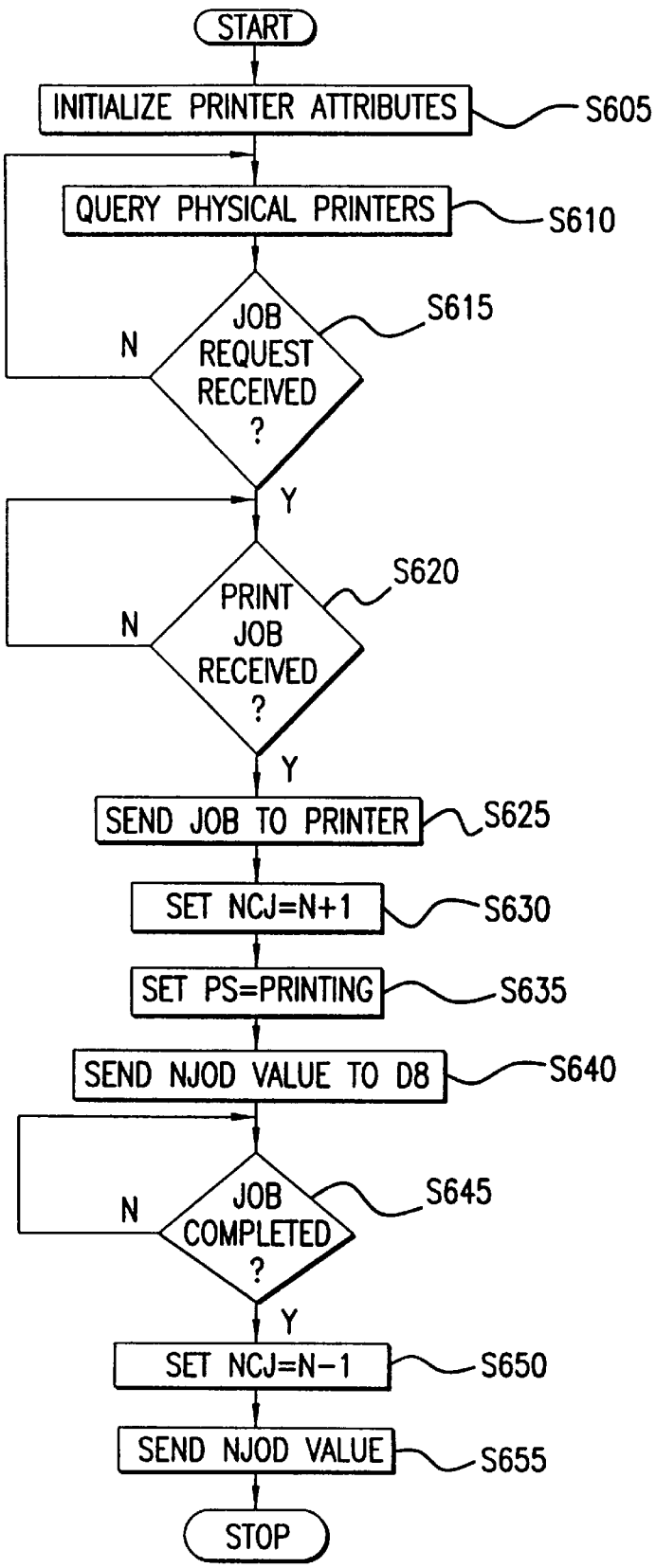
FIG. 6 is a flowchart outlining a printing process according to the invention.

FIG. 6 shows a more detailed printing process. In step S605, the printer attributes are initialized and in step S610, the physical printers are queried. Then, in step S615, if job requests are received, queue 414 of the spooler 410 is able to send a print job to the supervisor server 420. In step S620, the control routine checks if a new job is available. If a new job is received by the spooler 410, at step S625 a job is sent to the supervisor 240 and then to an available printer. Step S630 then sets the NCJ attribute to NCJ=N+1. Step S635 the printer state is set to "printing". Step S640 updates the NJOD attribute value if this feature/function is supported by the printer 500. Step S645 checks for completion of the print job by the printer 500. If completed, the control routine flows to S650 and the NCJ attribute is decremented by 1. If the NJOD feature is supported by the printer 500, step S655 again updates the NJOD attribute.

Figure 7:
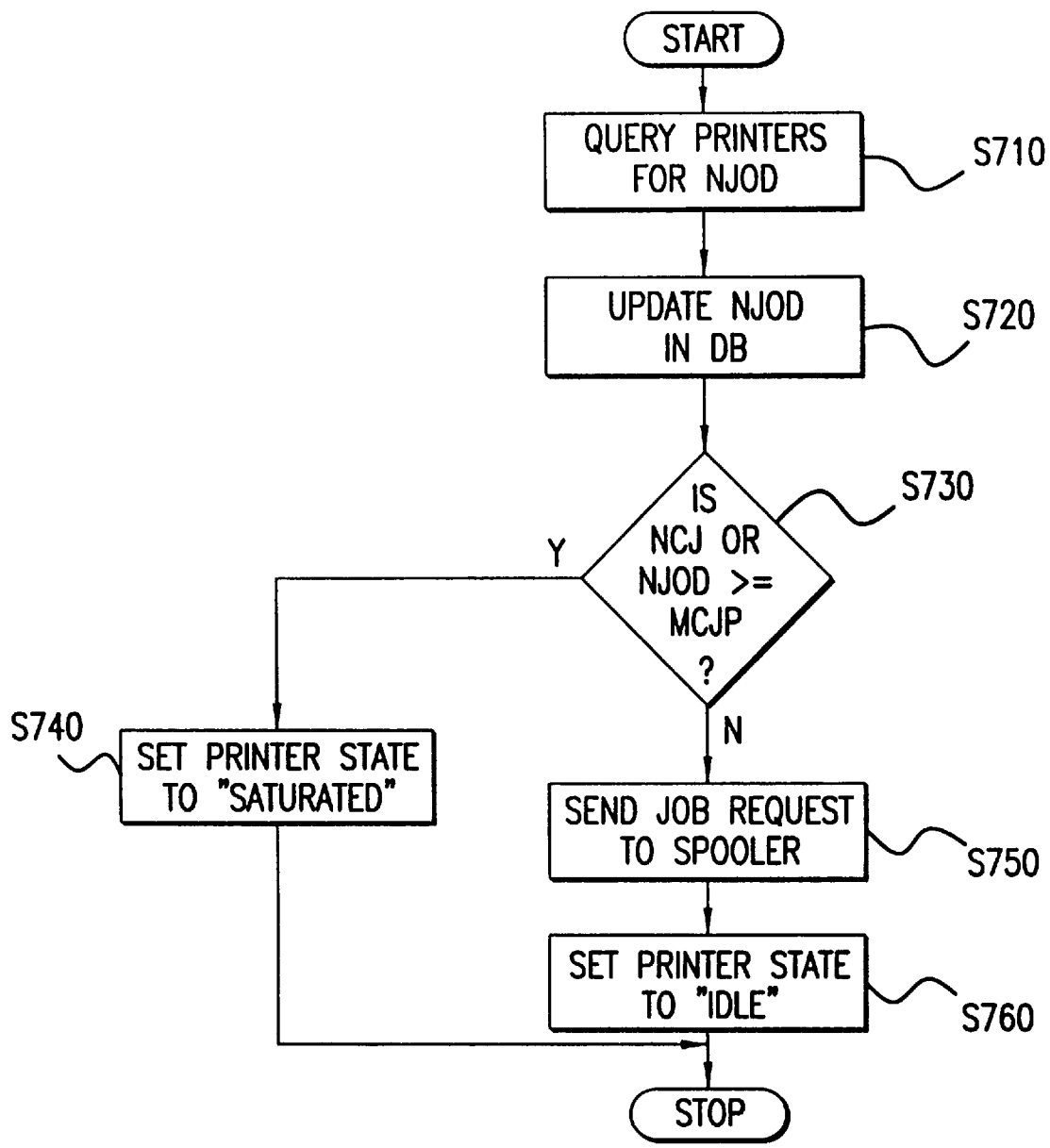
FIG. 7 is a flow chart outlining printer querying according to the invention.

FIG. 7 is a flowchart outlining a more detailed printer query process. In step S710, all physical printers 422 are queried by the supervisor 420 for the NJOD attribute. The NJOD attribute is then updated in step S720 if the printer supports this function. (If this function is not supported, the distributed printing system obtains the NCJ attribute, which serves as a fall back system of monitoring load balancing of unsupported printers, as detailed in FIG. 6.) Then, in step S730 either the NJOD or NCJ attribute values are compared with the value of the MCJP attribute (depending on whether the printer supports the NJOD attribute). If greater than or equal to the MCJP value, the particular printer is handling as many concurrent jobs as is possible and the control routine advances to step S740 and the attribute "printer-state" is set to "saturated". If not, the routine advances to step S750 and a job request is sent to the spooler 410 as the printer 500 is capable of accepting additional jobs. Flow then advances to step S760 and the "printer-state" attribute is reset to idle.

Accordingly, these attributes provide another level of load balancing not attainable by prior distributed printing systems by establishing three tiers of printer operation: 1) idle (not printing); 2) printing (and able to handle additional jobs); and 3) saturated (printing and unable to handle any further print jobs).

The invention provides both the NJOD and NCJ attributes to manage both supported and unsupported printers and attain load balancing. However, the attribute NJOD is a preferable attribute. Thus, if the printer does support NJOD, this value is compared against MCJP as this data is the most accurate reflection of the printers load. When an unsupported printer is provided, the attribute NCJ is compared against the attribute MCJP to determine saturation of the printer. Thus, these two attributes provide redundant systems that can accommodate supported and unsupported printers. Moreover, by providing a MCJP attribute that better reflects the capabilities of each individual printer, load balancing can be improved.

The system and method of this invention have been explained with reference to an exemplary client/server distributed printing system. However, the invention is not limited to this particular application and may be implemented in any distributed computer system that provides a hard copy output without departing from the spirit and scope of the invention. Various modifications and additions may be made without departing from the spirit and scope of the invention. In particular, the various functions described are not meant to be limiting but are rather illustrative of one particular embodiment and may be altered.

What is claimed is:

1. A distributed printing system that achieves load balancing on an associated output device, comprising:

a printer system that receives print requests representing jobs to be printed;

at least one output device associated with the printer system; and an attribute database associated with the printer system and containing printer attributes, the attributes including "max-concurrent-jobs-processing", "printer-state" having a "saturated" attribute value and one of "number-of-jobs-on-device" and "number-of-cascaded-jobs", the attribute "max-concurrent-jobs-processing" being assigned a numeric value corresponding to a number of concurrent print jobs that can be handled by the at least one output device, the attribute "number-of-cascaded-jobs" being a dynamic attribute having a value that is incremented by the printing system upon sending a print job to the at least one output device, the attribute "number-of-jobs-on-device" being a dynamic attribute that is updated by the at least one output device, and the attribute "printer-state" being a dynamic attribute that is set to "saturated" when one of the "number-of-jobs-on-device" and "number-of-cascaded-jobs" attributes has a value greater than or equal to the value of the attribute "max-concurrent-jobs-processing", the printing system being prevented from sending a print job to the at least one output device when the "printer-state" attribute is set to "saturated".

2. The distributed printing system of claim 1, wherein the attributes "max-concurrent-jobs-processing", "number-of-jobs-on-device" and "number-of-cascaded-jobs" have integer values.

3. The distributed printing system of claim 1, further comprising incrementing means for incrementing the value of the "number-of-cascaded-jobs" attribute upon sending of a print job to the at least one output device.

4. The distributed printing system of claim 3, wherein the output device provides a query response indicating completion of a print job and the printing system further includes a decrementing means responsive to the querying response to decrement the value of the "number-of-cascaded-jobs" attribute.

5. The distributed printing system of claim 1, wherein the output device is one of a printer, a fax machine and a pager.

6. The distributed printing system of claim 5, wherein at least two output devices are associated with the printing system.

7. The distributed printing system of claim 6, wherein the at least two output devices have corresponding "max-concurrent-jobs-processing" attributes with different values.

8. The distributed printing system of claim 1, wherein the printing system includes an updating means for updating the "number-of-jobs-on-device" attribute in the attribute database based on a query response received from the at least one output device.

9. The distributed printing system of claim 1, wherein the printing system includes a spooler that receives print requests and queues received print jobs and a server, responsive to the attributes within the attributes database, that sends job requests to the spooler and manages print job flow to the at least one output device.

10. A method of performing load balancing in a distributed printing system having at least one output device, comprising:
    storing printer attributes in a database, the printer attributes including:
        an attribute "max-concurrent-jobs-processing" assigned a numeric value corresponding to a number of concurrent print jobs that can be handled by the at least one output device,
        an attribute "printer-state" having a value "saturated", and
    at least one of:
        an attribute "number-of-cascaded-jobs" that is a dynamic attribute having a value that is incremented by the printing system upon sending a print job to the at least one output device, and
        an attribute "number-of-jobs-on-device" that is a dynamic attribute that is updated by the at least one output device;
    receiving a print request;
    generating a print job from the print request and storing the print job until the print job can be sent to the at least one output device;
    comparing at least one of the attributes "number-of-jobs-on-device" and "number-of-cascaded-jobs" attributes against the attribute "max-concurrent-jobs-processing" and setting the attribute "printer-state" to "saturated" for the at least one output device when either has a value greater than or equal to the value of the attribute "max-concurrent-jobs-processing; and
    sending the print job to the at least one output device if the attribute "printer-state" is idle or printing.

11. The method of claim 10, wherein the printing system is a client/server distributed printing system comprising a client, a spooler, a supervisor, and at least one output device, the method further comprising:
    receiving a print request from the client at the spooler;
    generating a print job from the request and storing the print job in a queue within the spooler;
    generating a job request at the supervisor when at least one of the output devices has the attribute "printer-state" value equal to idle or printing; and
    sending the print job to the supervisor in response to the job request for subsequent sending to the at least one output device.

12. The method of claim 10, further comprising incremented the attribute "number-of-cascaded-jobs" upon sending the print job to the at least one output device.

13. The method of claim 12, further comprising decrementing the attribute "number-of-cascaded-jobs" upon indication of completion of the print job by the at least one output device.

14. The method of claim 10, wherein at least two output devices are provided and respective "max-concurrent-jobs-processing" attributes are different based on differing capabilities of the respective output devices.

15. The method of claim 10, wherein the attributes are periodically updated and the step of comparing is periodically conducted.

16. The method of claim 10, further comprising initializing the attributes.

17. The method of claim 16, further comprising manually entering the attribute "max-concurrent-jobs-processing" into the database.

18. The method of claim 16, further comprising setting the attribute "number-of-jobs-on-device" to "null" and disregarding the "number-of-jobs-on-device" attribute if the output device does not support the "number-of-jobs-on-device" attribute.

* * * * *